US009183526B2

(12) United States Patent
Philip et al.

(10) Patent No.: US 9,183,526 B2
(45) Date of Patent: Nov. 10, 2015

(54) METADATA-DRIVEN AUDIT REPORTING SYSTEM THAT APPLIES DATA SECURITY TO AUDIT DATA

(71) Applicant: Oracle International Corporation, Redwood Shores, CA (US)

(72) Inventors: Deena Philip, Sunnyvale, CA (US); George Kellner, San Mateo, CA (US); Mohan Arthur, San Ramon, CA (US); Paul Johl, Centennial, WY (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/200,382

(22) Filed: Mar. 7, 2014

(65) Prior Publication Data

US 2015/0074747 A1 Mar. 12, 2015

Related U.S. Application Data

(60) Provisional application No. 61/876,465, filed on Sep. 11, 2013.

(51) Int. Cl.
*G06F 21/62* (2013.01)
*G06Q 10/06* (2012.01)
*G06F 17/30* (2006.01)

(52) U.S. Cl.
CPC ...... *G06Q 10/0633* (2013.01); *G06F 17/30386* (2013.01); *G06F 17/30554* (2013.01); *G06F 21/62* (2013.01)

(58) Field of Classification Search
CPC .......... G06F 21/577; G06F 2221/2101; G06F 21/552; G06F 2221/2117; G06F 2221/2149; G06F 2221/2145; G06F 21/604; H04L 41/0604; H04L 43/06; H04L 63/0428; H04L 41/22; H04L 63/20; H04L 63/08; H04L 63/0227
USPC ........................................................... 726/1
See application file for complete search history.

(56) References Cited

U.S. PATENT DOCUMENTS

| 8,117,640 | B1* | 2/2012 | Moriconi et al. ................. 726/1 |
| 2003/0220940 | A1 | 11/2003 | Futoransky et al. |
| 2005/0193043 | A1 | 9/2005 | Hoover |
| 2007/0005665 | A1 | 1/2007 | Vaitzblit et al. |
| 2007/0011746 | A1* | 1/2007 | Malpani et al. ................. 726/25 |
| 2010/0088738 | A1* | 4/2010 | Birnbach ........................... 726/1 |
| 2011/0302622 | A1* | 12/2011 | Bregman et al. ................. 726/1 |

(Continued)

OTHER PUBLICATIONS

Oracle Audit Vault and Database Firewall, Developer's Guide, Release 12.1.1, E27779-02, Sep. 2013, http://docs.oracle.com/cd/E37100_01/doc.121/e27779.pdf.

(Continued)

*Primary Examiner* — Saleh Najjar
*Assistant Examiner* — Oleg Korsak
(74) *Attorney, Agent, or Firm* — Miles & Stockbridge P.C.

(57) ABSTRACT

A system is provided that reports audit data. The system defines metadata that defines security conditions for a business object. The system further receives a request from a user to retrieve audit data contained within a database table, where the audit data includes a history of modifications to an attribute of the business object. The system further retrieves the audit data from the first database table. The system further applies the security conditions to the audit data based on the metadata. The system further displays the audit data within a user interface when the security conditions are satisfied.

16 Claims, 10 Drawing Sheets

(56) References Cited

U.S. PATENT DOCUMENTS

2012/0096521 A1* 4/2012 Peddada .................... 726/4
2013/0031067 A1 1/2013 Iyer et al.

OTHER PUBLICATIONS

Oracle Audit Vault, Oracle Data Sheet, Copyright 2009, http://www.oracle.com/us/products/database/056885.pdf.

Oracle Audit Vault, An Oracle White Paper, Mar. 2009, http://www.oracle.com/us/products/database/056887.pdf.

Oracle E-Business Suite Integrated SOA Gateway Implementation Guide, Release 12.1 http://docs.oracle.com/cd/E18727_01/doc.121/e12169/T511175T513091.htm#sigig_secws_function (last visited Dec. 11, 2013).

Oracle Fusion Applications Security Guide, 11.1.7, E16689-07, http://docs.oracle.com/cloud/131/user_services/OASEC.pdf, Mar. 2013.

Salesforce, "Audting", http://help.salesforce.com/apex/HTViewHelpDoc?id=security_overview_auditing.htm (last visited Dec. 11, 2013).

Salesforce, "Monitoring Login History", http://help.salesforce.com/apex/HTViewHelpDoc?id=users_login_history.htm&language=en_US (last visited Dec. 11, 2013).

Salesforce, "Tracking Field History", http://help.salesforce.com/apex/HTViewHelpDoc?id=tracking_field_history.htm&language=en_US (last visited Dec. 11, 2013).

Salesforce, "Monitoring Setup Changes", http://help.salesforce.com/apex/HTViewHelpDoc?id=admin_monitorsetup.htm&language=en_US (last visited Dec. 11, 2013).

Deena Philip et al., U.S. Appl. No. 14/200,226, filed Mar. 7, 2014.
Deena Philip et al., U.S. Appl. No. 14/200,243, filed Mar. 7, 2014.
Deena Philip et al., U.S. Appl. No. 14/200,390, filed Mar. 7, 2014.

* cited by examiner

200

210 — 211 WEBAPP VARCHAR2(80)

212 APPLICATION_MODULE VARCHAR2(240)

220
| WEBAPP | VIEW_OBJECT | VIEW_ATTRIBUTE | ENABLED_FLAG | TABLE_NAME | COLUMN_NAME |
|---|---|---|---|---|---|
| VARCHAR2(80) | VARCHAR2(240) | VARCHAR2(80) | VARCHAR2(1) | VARCHAR2(30) | VARCHAR2(30) |

| Business Object Identifier | Audit Data |
|---|---|
| 101 | xxxxxx |
| 102 | xxxxxx |
| 103 | xxxxxx |

Shadow Database Table 910

| Business Object Identifier | Security Condition |
|---|---|
| 101 | Security Condition 1 |
| 102 | Security Condition 2 |
| 103 | Security Condition 3 |

Security Table 920

Fig. 9

METADATA-DRIVEN AUDIT REPORTING SYSTEM THAT APPLIES DATA SECURITY TO AUDIT DATA

CROSS-REFERENCE TO RELATED APPLICATIONS

This application claims priority of U.S. Provisional Patent Application Ser. No. 61/876,465, filed on Sep. 11, 2013, the subject matter of which is hereby incorporated by reference.

FIELD

One embodiment is directed to a computer system, and more particularly, to a computer system that audits data.

BACKGROUND

A software application (or "application") is generally used for automating transactions related to processes of operations, such as business operations. Typically, processes include one or more transactions which may insert, update, or delete operations data (i.e., data related to the operations). The integrity and consistency of the operations data is generally very important, especially with regards to the creditability of records, service provisions, and maintenance of records. An application can be executed on a computer system in order to perform the operation processes.

In order to ensure integrity and consistency of the operations data, data auditing (or "auditing") of the operations data can be performed. Auditing is a process of tracking modifications to data, such as what data has been modified, who has made the modifications to the data, and when the modifications to the data were made. Further, auditing can maintain a history of modifications in chronological order so that operations data can be restored in case of any loss of data or data corruption. Auditing can be performed on the operations data for various reasons, such as system security, fault investigation, maintenance of history, or compliance with organizational policies or regulatory requirements. Moreover, auditing can help in analyzing a pattern of modifications in the operations data.

SUMMARY

One embodiment is a system that reports audit data. The system defines metadata that defines security conditions for a business object. The system further receives a request from a user to retrieve audit data contained within a database table, where the audit data includes a history of modifications to an attribute of the business object. The system further retrieves the audit data from the first database table. The system further applies the security conditions to the audit data based on the metadata. The system further displays the audit data within a user interface when the security conditions are satisfied.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 2 illustrates an example metadata structure utilized to generate audit data for an audit report system, according to an embodiment of the invention.

FIG. 9 illustrates example security metadata stored within a shadow database table and a security table, according to an embodiment of the invention.

DETAILED DESCRIPTION

According to an embodiment, a metadata-driven audit reporting system is provided that can generate and display a report of audit data, where audit data includes a history of modifications that have been made to data in one or more software application modules (also identified as application modules), such as an operation that was performed on a business object of the application module, when the operation was performed, and how an attribute of the business object was modified. When retrieving the audit data, the audit reporting system can apply data security to the audit data using one or more security conditions in order to determine whether an end user is able to access the audit data. If the one or more security conditions are satisfied (i.e., if the end user is able to access the audit data), the audit reporting system can display the audit data within a user interface. If the one or more security conditions are not satisfied (i.e., the end user is not able to access the audit data), the audit reporting system does not display the audit data (i.e., restricts the display of the audit data) within the user interface. In an embodiment, the data security that is applied to audit data can be identical to the data security that is applied to "base data" that the audit data is based upon, where "base data" is data that is associated with a business object, and stored within a base database table. Thus, a user who views an audit report displayed by the audit reporting system can only see audit data for business objects where the user has an access entitlement to view the corresponding business objects. If the user does not have an access entitlement to view the base data that the audit data is based upon, then the user cannot view the audit data either.

As understood by one of ordinary skill in the art, in order to ensure secure access to web service content, "function security" and "data security" can be provided. "Function security" is basic access control for an application module that is independent of application data of the application module. For example, function security can restrict access to individual menus and menu options within an application module regardless of application data. Building on function security, "data security" provides another layer of security control to model and enforce security authorizations of specific data records of an application module. In other words, data security further refines the security of accessing application records to the data level. According to an embodiment of the invention, as is described below in greater detail, an audit reporting system can apply data security to audit data that is identical to data security that is applied to base data that the audit data is based on. Thus, the audit reporting system can provide a layer of security control to audit data, and can enforce security authorizations of audit data that are identical to security authorizations of the underlying base data.

Figure 1:
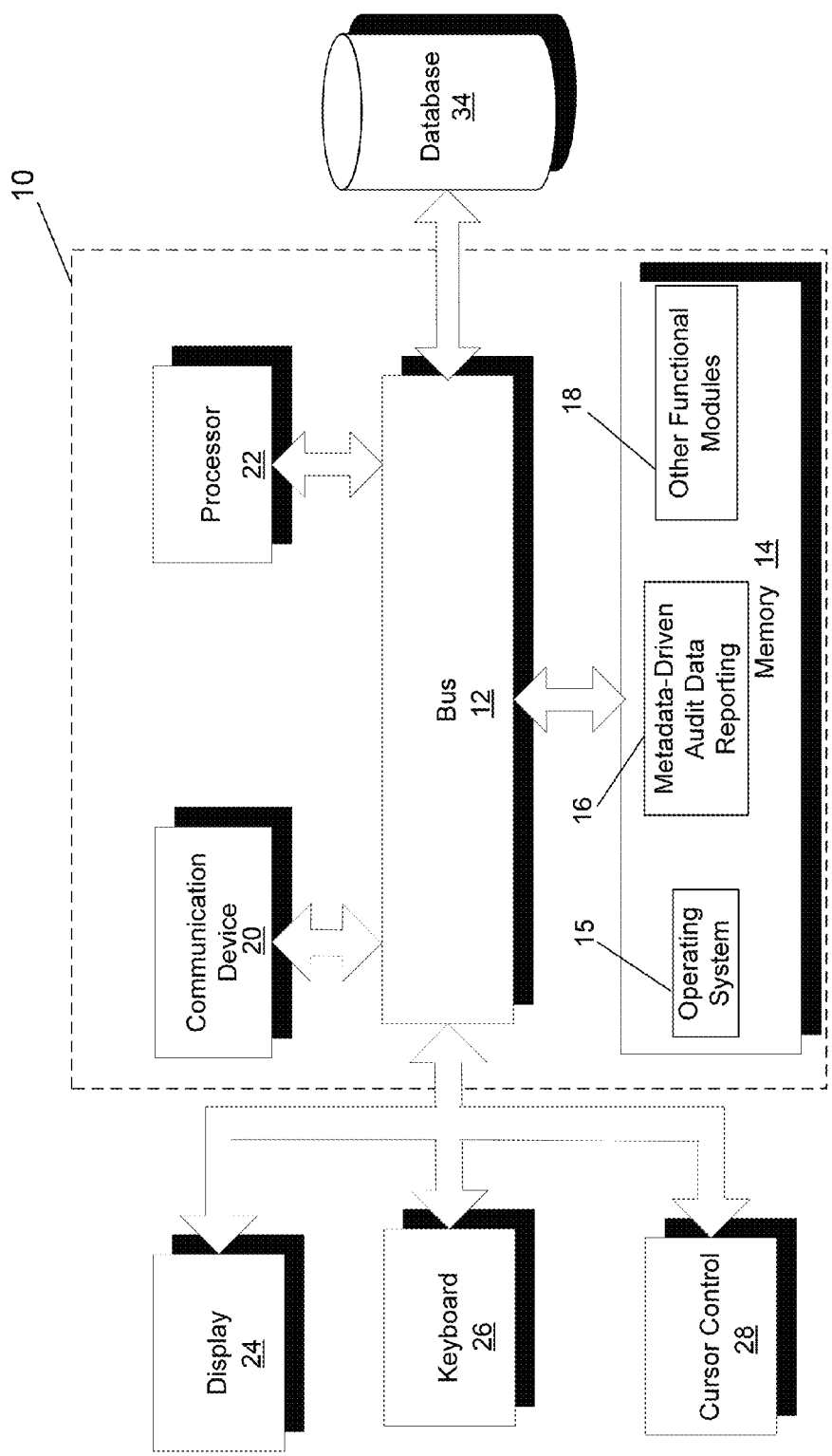
FIG. 1 illustrates a block diagram of a system that can implement an embodiment of the invention.

FIG. 1 illustrates a block diagram of a system 10 that may implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a metadata-driven audit data reporting module 16, as well as other functional modules 18. Operating system 15 can provide an operating system functionality for system 10. Metadata-driven audit data reporting module 16 can provide functionality for reporting audit data, as is described in more detail below. In certain embodiments, metadata-driven audit data reporting module 16 can comprise a plurality of modules that each provide specific individual functionality for reporting audit data. System 10 can also be part of a larger system. Thus, system 10 can include one or more additional functional modules 18 to include the additional functionality. For example, functional modules 18 may include modules that provide additional functionality, such as "Oracle Fusion" middleware products, or other "Oracle Fusion" products, from Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

FIG. 2 illustrates an example metadata structure 200 utilized to generate audit data for an audit report system, according to an embodiment of the invention. As previously described, audit data includes a history of modifications that have been made to data. For example, audit data can include specific operations (such as insert operations, update operations, and delete operations) that have been performed on data over a specific period of time. Audit data can further include a specific user that performed operations on data over a specific period of time. The metadata contained within metadata structure 200 can be utilized to generate audit data for an audit report system according to a metadata-driven object-based audit framework. More specifically, the metadata contained within metadata structure 200 can define business objects of an application module as being auditable. An application module is a collection of one or more computer-readable instructions for executing a specific functionality. A business object is a collection of data contained within one or more base database tables, where the data is logically related to a logical entity within an application module. When the metadata defines a business object as being auditable, the audit report system can expose the business object to a user (such as within a user interface), where the user can configure the business object to enable auditing, as is described below in greater detail.

Further, the metadata can define attributes of a business object as being auditable. An attribute is data contained within one or more fields of a base database table, where the base database table is associated with a business object. When the metadata defines an attribute as being auditable, the audit report system can expose the attribute to a user, where the user can configure the attribute to enable auditing, as is also described below in greater detail. The aforementioned metadata can be part of an object-based audit framework for an application module, where the object-based audit framework can be utilized in auditing transactions involving business objects (and their attributes) of the application module.

Metadata structure 200 includes two database schema tables, application module table 210 and attribute table 220. Application module table 210 and attribute table 220 each contain metadata that can define attributes of business objects of an application module, as well as the business objects themselves, as being auditable. These tables are referenced along with computer files that include computer program code to determine at runtime a complete configuration of which business objects and attributes are auditable. By defining attributes and/or business objects as being auditable, the metadata causes an audit reporting system to allow a user to configure the attributes and/or business objects in order to enable auditing, as is described below in greater detail. Thus, the metadata defines one or more attributes of one or more business objects as being auditable by an object-based audit framework.

Application module table 210 stores metadata that identifies one or more application modules of an application. More specifically, application module table 210 includes application column 211 and application module column 212. Application column 211 is a column (i.e., attribute) of application module table 210 that stores an application identifier that identifies an application. Application module column 212 is a column of application module table 210 that further stores an application module identifier that identifies an application module of an application.

Attribute table 220 further stores metadata that identifies one or more attributes associated with a business object. More specifically, attribute table 220 includes application column 221, business object column 222, attribute column 223, auditing enabled column 224, shadow database table name column 225, and shadow database column name column 226. Application column 221 stores an application identifier that identifies an application. Business object column 222 stores a business object identifier that identifies a business object of an application module. Attribute column 223 stores an attribute identifier that identifies an attribute of a business object. Auditing enabled column 224 stores an auditing enabled flag that identifies whether auditing is enabled for the attribute. Shadow database table name column 225 stores a shadow database table name that identifies a shadow database table that stores audit data, as is described below in greater detail. Shadow database column name column 226 stores a shadow database column name that identifies a column of the shadow database table that stores audit data, as is also described below in greater detail.

According to an embodiment, an application module of an application can be registered with application module table 210 by populating metadata within application module table 210, where the metadata includes an application identifier that identifies the application, and an application module identifier that identifies the application module of the application. In one embodiment, the application module can be registered with application module table 210 by passing the application identifier and the application module identifier to a service of the audit report system, where the service automatically populates metadata within application module table 210, where the metadata includes the application identifier and the application module identifier.

After an application module has been registered with application module table 210, a business object of the application module can be defined as being auditable by populating metadata within attribute table 220, where the metadata includes a business object identifier that identifies the business object. In one embodiment, a business object can be defined as being auditable by setting a value of a custom property of the business object to a value that indicates the business object is auditable. For example, as shown in the example computer program code, a custom property with the name "Auditable" can be set with a value "Y":

```
<Properties>
    <CustomProperties>
        <Property
            Name="Auditable"
            Value="Y"/>
    </CustomProperties>
</Properties>
```

According to the embodiment, by setting a custom property of the business object to a value that indicates the business object is auditable, the audit reporting system can automatically populate metadata within attribute table 220, where the metadata includes a business object identifier that identifies the business object.

Further, after a business object has been defined as being auditable, an attribute of the business object can be defined as being auditable based on computer files that include computer program code. Once an attribute is selected for audit in a runtime setup user interface, metadata is populated within attribute table 220, where the metadata includes an attribute identifier that identifies the attribute. In one embodiment, once a business object has been defined as auditable, all of its attributes are automatically defined as being auditable, unless an attribute is explicitly defined as not being auditable. According to this embodiment, an attribute can be defined as not being auditable by setting a value of a custom property of the attribute to a value that indicates the attribute is not auditable. For example, as shown in the example computer program code, a custom property with the name "Auditable" can be set with a value "N":

```
<ViewAttribute
    Name="Attribute1"
    IsUpdateable="false"
    PrecisionRule="true"
    EntityAttrName="Attribute1"
    EntityUsage="AttributeEO"
    AliasName="ROWID">
    <Properties>
        <CustomProperties>
            <Property
                Name="Auditable"
                Value="N"/>
        </CustomProperties>
        <SchemaBasedProperties>
            <DISPLAYHINT
                Value="Hide"/>
        </SchemaBasedProperties>
    </Properties>
</ViewAttribute>
```

According to the embodiment, if the custom property with the name "Auditable" is set with a value "Y," the attribute can be defined as being auditable if just the business object is selected for auditing. Further, if no custom property is defined for the attribute, a value of "Y" can be interpreted by the audit reporting system, and the attribute can be defined as being auditable but not preselected if the business object is enabled for auditing. Thus, according to the embodiment, by setting a custom property of the attribute to a value that indicates the attribute is auditable (or by not setting a custom property of the attribute to any value), the audit reporting system can automatically populate metadata within attribute table 220, where the metadata includes an attribute identifier that identifies the attribute.

Once metadata has been defined for, and populated within, application module table 210 and attribute table 220, a user of the audit reporting system can configure the metadata using a user interface of the audit reporting system, as is further described below in greater detail in conjunction with FIG. 4. According to an embodiment, a user-friendly display name can be defined for all application modules, business objects, and attributes. The display of a user-friendly display name can assist in the configuration of the metadata contained within application module table 210 and attribute table 220. Further, for application modules and business objects, a "tooltip" can be defined, where a tooltip is a text box that contains information, and where a tooltip can be displayed within the user interface when a user "hovers" a pointer, or other type of icon, over an object. The tooltip can display further information about the application module or business object that a user hovers the pointer over within the user interface. In one embodiment, a label property and/or a tooltip property can be defined for an application module, a business object, and/or an attribute. For example, as shown in the example computer program code, a label property and a tooltip property can be defined for a business object:

```
<Properties>
    <CustomProperties>
        <Property
            Name="Auditable"
            Value="Y"/>
    </CustomProperties>
    <SchemaBasedProperties>
        <LABEL
            ResId="ViewObjectVO_LABEL"/>
        <TOOLTIP
            ResId="ViewObjectVO_TOOLTIP"/>
    </SchemaBasedProperties>
</Properties>
<ResourceBundle>
    <XliffBundle
id="oracle.apps.fnd.applcore.audit.test.model.view.common.
ViewObjectVOMsgBundle"/>
</ResourceBundle>
```

As another example, as shown in the example computer program code, a label property can be defined for an attribute:

```
<ViewAttribute
    Name="TableName"
    PrecisionRule="true"
    EntityAttrName="TableName"
    EntityUsage="FndAuditAttributesEO"
    AliasName="TABLE_NAME">
    <Properties>
        <SchemaBasedProperties>
            <LABEL
                ResId="TableName_LABEL"/>
        </SchemaBasedProperties>
    </Properties>
</ViewAttribute>
```

Further, according to the embodiment, the user interface of the audit reporting system can be used to search for a business object. Further, the business object can be searched using a key (i.e., an attribute) that may not be a primary key of the business object, by setting a value of a custom property of the attribute to a value that indicates the attribute is a user key for the business object. If not defined, the system can set the key to the first primary key. For example, as shown in the example computer program code, a custom property with the name "AUDIT_USER_KEY" can be set with a value "Y":

```
<ViewAttribute
    Name="TableName"
    IsUnique="true"
    IsNotNull="true"
    PrecisionRule="true"
    EntityAttrName="TableName"
    EntityUsage="FndTablesEO"
    AliasName="TABLE_NAME">
    <Properties>
        <CustomProperties>
            <Property
                Name="AUDIT_USER_KEY"
                Value="Y"/>
        </CustomProperties>
    </Properties>
</ViewAttribute>
```

According to the embodiment, by setting a custom property of the attribute of the business object to a value that indicates the attribute is a user key of the business object, the business object can be searched upon within the user interface using the attribute.

Further, the metadata included within attribute table 220 can be configured. More specifically, an auditing enabled flag that is associated with an attribute can be set to a value that identifies that auditing is enabled for the attribute within attribute table 220. By setting the auditing enabled flag to a value that identifies that auditing is enabled for the attribute, the audit reporting system can generate audit data for the attribute, and can display the audit data within a user interface. An auditing enabled flag for an attribute can be set to a value that identifies that auditing is enabled for the attribute using a user interface of the audit reporting system, as is further described below in greater detail in conjunction with FIG. 4. In one embodiment, when an auditing enabled flag for an attribute is set to a value that identifies that auditing is enabled for the attribute, a shadow database table name that identifies a shadow database table that stores audit data can also be defined, and a shadow database column name that identifies a column of the shadow database table that stores audit data can also be defined. Further, the generation of the audit data is further described below in greater detail in conjunction with FIG. 5, and the displaying of the audit data is further described below in greater detail in conjunction with FIG. 6.

Figure 3:
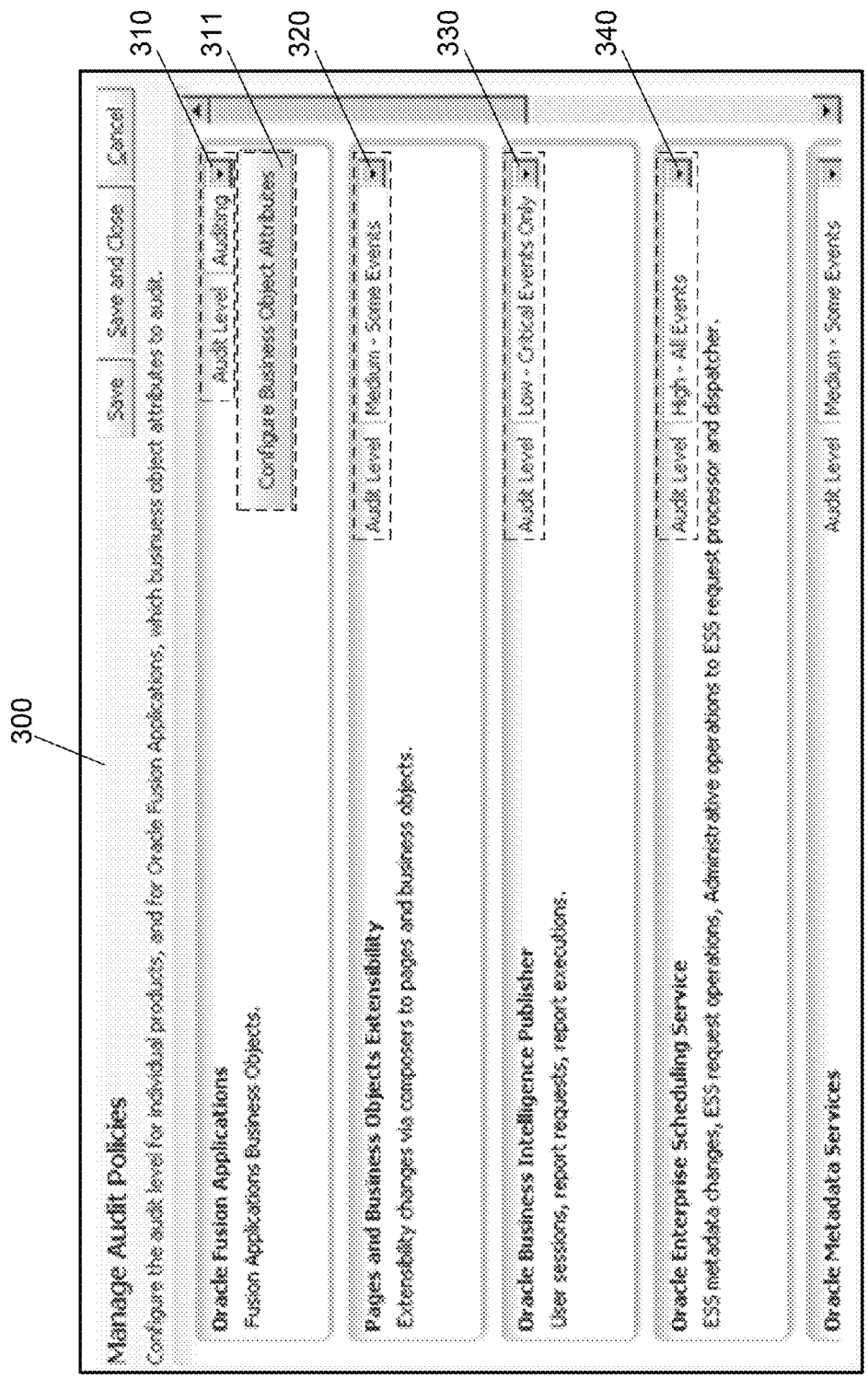
FIG. 3 illustrates an example audit configuration user interface, according to an embodiment of the invention.

FIG. 3 illustrates an example audit configuration user interface 300, according to an embodiment of the invention. According to the embodiment, audit configuration user interface 300 allows a user to configure the auditing of data by an audit reporting system. More specifically, audit configuration user interface 300 allows a user to configure the auditing of data for an application using a metadata-driven object-based audit framework, and to also configure the auditing of data for an application using an event-based audit framework.

A metadata-driven object-based audit framework is previously described in conjunction with FIG. 2. An event-based audit framework involves the generation of audit data by the audit reporting system in response to an event within an application. An "event" is an action or occurrence detected by the application. An example of an event is a login failure, where the login failure has an event that records a user, a time, and an event identifier indicating that the login attempt was a failed login attempt. Upon the occurrence of an event, the audit reporting system can capture data and convert the captured data into audit data. The audit reporting system can further store the audit data into an event database table. The event database table can be separate from the shadow database table utilized by the metadata-driven object-based audit framework, and can have a format that is different from the format of the shadow database table. The audit reporting system can subsequently combine the audit data stored within the event database table with the audit data stored within the shadow database table, despite the difference in the two formats, and can display the audit data within a user interface. The two types of audit data can be displayed within the user interface using a single format.

According to the embodiment, a user can enable or disable auditing for an application according to a metadata-driven object-based audit framework using audit level drop-down list 310. By interacting with audit level drop-down list 310, the user can cause the audit reporting system to configure metadata, such as the metadata stored in metadata structure 200 of FIG. 2. Further, a user can enable or disable auditing for one or more specific attributes of one or more specific business objects according to the metadata-driven object-based audit framework using business object attribute configuration button 311. By interacting with business object attribute configuration button 311, the user can cause the audit reporting system to configure metadata, such as the metadata stored in metadata structure 200 of FIG. 2, for one or more specific attributes of one or more specific business objects. The configuration of metadata for one or more specific attributes of one or more specific business objects is further described below in greater detail in conjunction with FIG. 4. Further, in an alternate embodiment, audit level drop-down list 310 of audit configuration user interface 300 can enable or disable auditing for all business objects for the selected application that have been defined as being auditable.

According to the embodiment, a user can enable, disable, or configure auditing for an application according to an event-based audit framework using one of audit level drop-down lists 320, 330, and 340. More specifically, a user can set an audit level to one of a plurality of audit levels using one of audit level drop-down lists 320, 330, and 340, where each audit level defines an event type (or event types) that trigger a capture of data associated with the event, and the conversion of the captured data into audit data, which is subsequently stored within the event database table. In one example embodiment, the plurality of audit levels can include the following audit levels: (1) High (captures all events); (2) Low (only captures critical events); (3) Medium (only captures critical events and certain non-critical events); or (4) None (does not capture any events).

Figure 4:
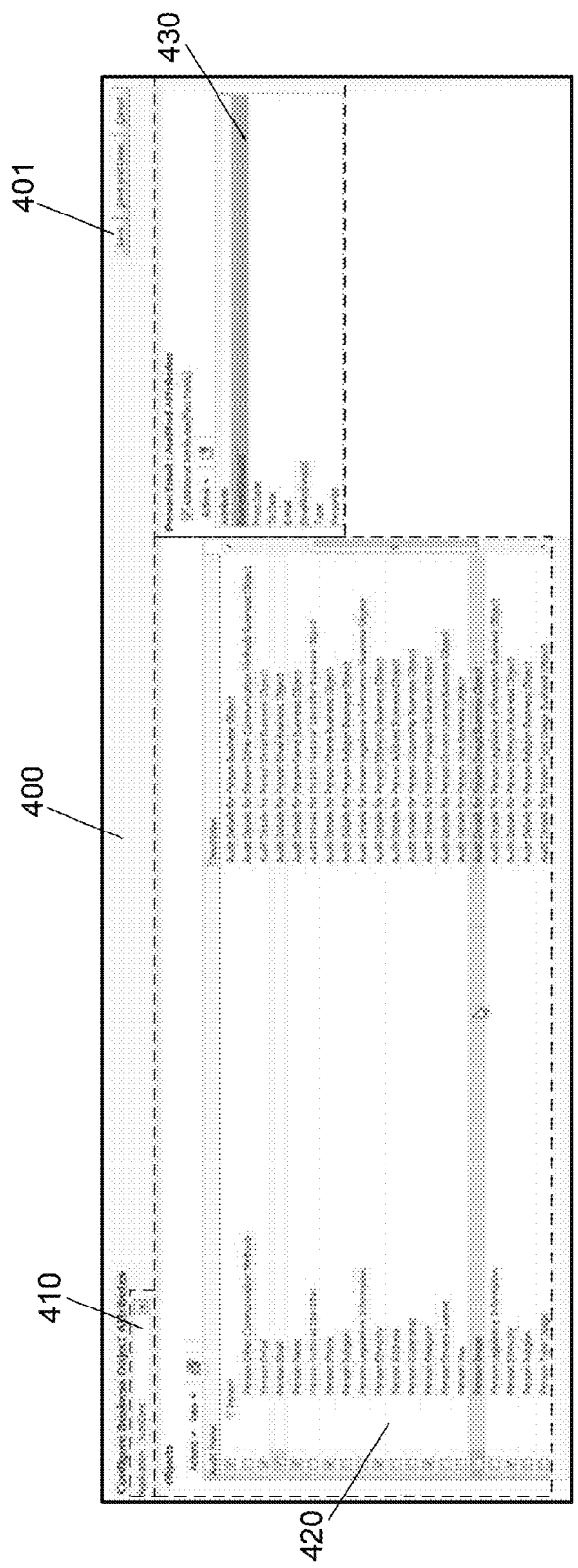
FIG. 4 illustrates an example business object audit configuration user interface, according to an embodiment of the invention.

FIG. 4 illustrates an example business object audit configuration user interface 400, according to an embodiment of the invention. According to the embodiment, business object audit configuration user interface 400 allows a user to configure metadata for one or more specific attributes of one or more specific business objects. By configuring metadata for one or more attributes, the user can enable or disable auditing for the one or more attributes. Further, the configuration of the metadata for an attribute can include setting a value of an auditing enabled flag that is associated with an attribute to either: (1) a value that identifies that auditing is enabled for the attribute; or (2) a value that identifies that auditing is disabled for the attribute. In one embodiment, business object audit configuration user interface 400 can be displayed upon an interaction with business object attribute configuration button 311 of FIG. 3.

According to the illustrated embodiment, business object audit configuration user interface 400 includes application drop-down list 410, business object window 420 and attribute window 430. A user can select an application using application drop-down list 410. In response to the selection of an application using application drop-down list 410, business object window 420 displays all business objects for the selected application that have been defined as being auditable. The business objects can be defined as being auditable based on metadata, such as metadata included within metadata structure 200 of FIG. 2. For each business object displayed within business object window 420, a user can "check" or "uncheck" an auditing enabled flag. By "checking" an auditing enabled flag for a business object, a user can cause one or more attributes of the business object to be enabled for auditing. By "unchecking" an auditing enabled flag for the business object, the user can cause one or more attributes of the business object not to be enabled for auditing. Upon "clicking" on save button 401, the audit reporting system can configure metadata, such as metadata included within metadata structure 200 of FIG. 2, based on the user's selections.

Further, a user can select a business object displayed within business object window 420. In response to the selection of a business object within business object window 420, attribute window 430 displays all attributes for the selected business object that have been defined as being auditable. The attributes can be defined as being auditable based on metadata, such as metadata included within metadata structure 200 of FIG. 2. For each attribute displayed within attribute window 430, a user can select or unselect the attribute. By selecting the attribute, the user can cause the attribute to be enabled for auditing. By unselecting the attribute, the user can cause the attribute not to be enabled for auditing. Upon "clicking" on save button 401, the audit reporting system can configure metadata, such as metadata included within metadata structure 200 of FIG. 2, based on the user's selections.

Further, in an alternate embodiment, one or more attributes can be flex fields. A flex field is a set of placeholder fields, also identified as segments, which are associated with a business object, and where a segment captures a single atomic value, which is represented in the base database table as a single column. Also, in an alternate embodiment, a user can initiate a tracking of a flex field attribute by the audit reporting system (also identified as synchronizing an attribute) using a synchronize button (not illustrated in FIG. 4), since flex fields may be defined at runtime.

Figure 5:
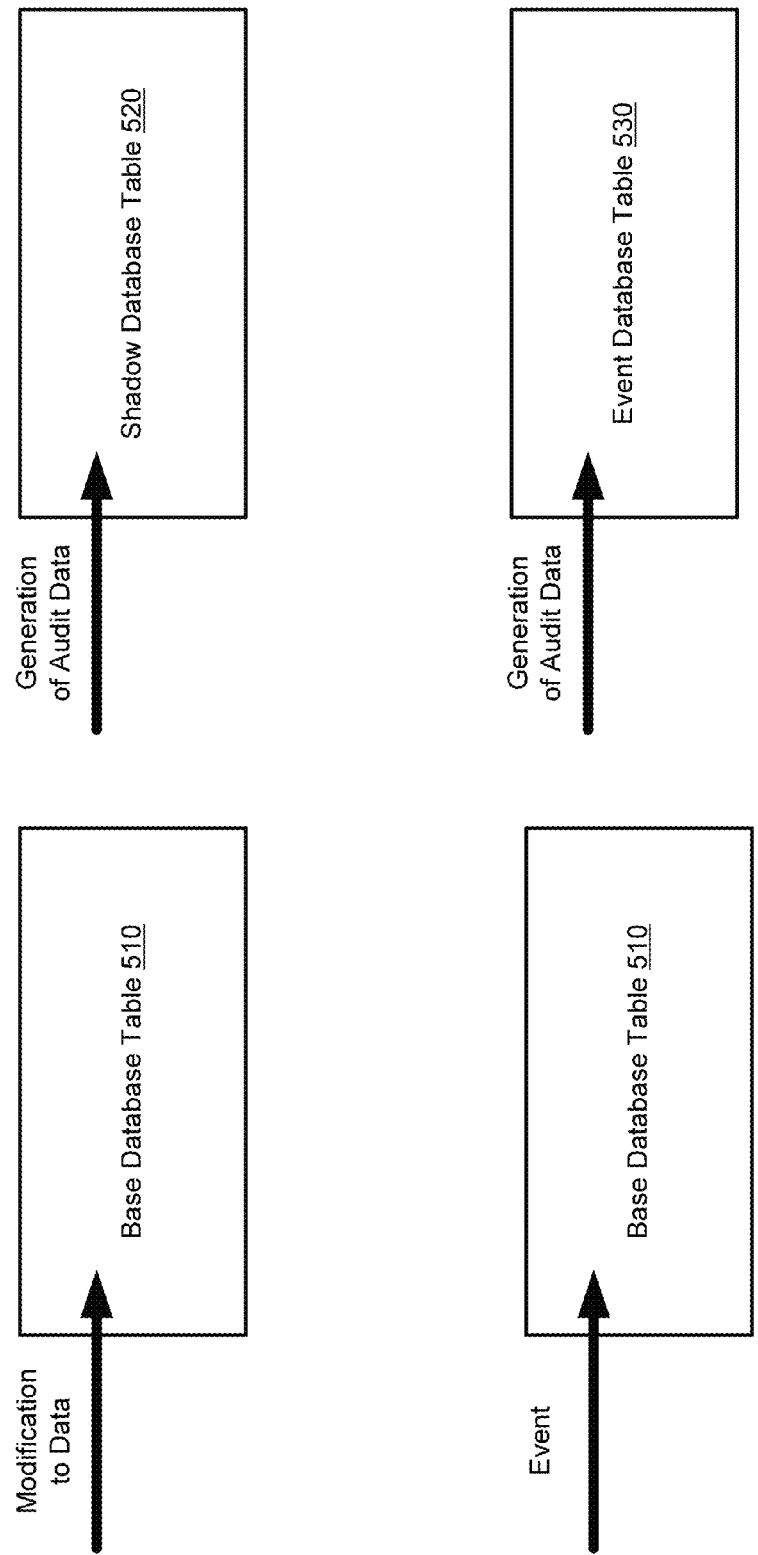
FIG. 5 illustrates a generation of audit data, according to an embodiment of the invention.

FIG. 5 illustrates a generation of audit data, according to an embodiment of the invention. In accordance with a metadata-driven object-based audit framework, for every base database table (such as base database table 510) that is associated with a business object that is enabled for auditing, a shadow database table (such as shadow database table 520) is created. Shadow database table 520 can include an identical set of columns as base database table 510, and can include one or more additional columns for internal usage purposes. Further, upon creation of shadow database table 520, metadata (such as metadata included within metadata structure 200 of FIG. 2) can be configured to include a shadow database table name that identifies shadow database table 520, and a shadow database column name that identifies a column of shadow database table 520. During execution of an application, in response to a modification to data stored within base database table 510 (such as an insert operation, a delete operation, or an update operation), audit data is generated and stored within shadow database 520. Such audit data can include the data stored within base database table 510 prior to the modification, the data stored within base database table 510 after the modification, and/or a user identifier that identifies a specific user that performed the modification. The generation and storage of audit data within shadow database 520 can be accomplished through one or more application program interfaces ("APIs"), as understood by one of ordinary skill in the relevant art.

Further, in accordance with an event-based audit framework, a single event database table (such as event database table 530) is created for all base database tables (such as base database table 510). During execution of an application, in response to an event occurrence at base database table 510 (such as a login failure event), audit data is generated and stored within event database table 530. Such audit data can include the data stored within base database table 510 prior to the event, the data stored within base database table 510 after the event, an event identifier that identifies the event, a date, a time, and/or a user identifier that identifies a specific user that initiated the event. The generation and storage of audit data within event database 530 can be accomplished through one or more application program interfaces ("APIs"), as understood by one of ordinary skill in the relevant art.

Figure 6:
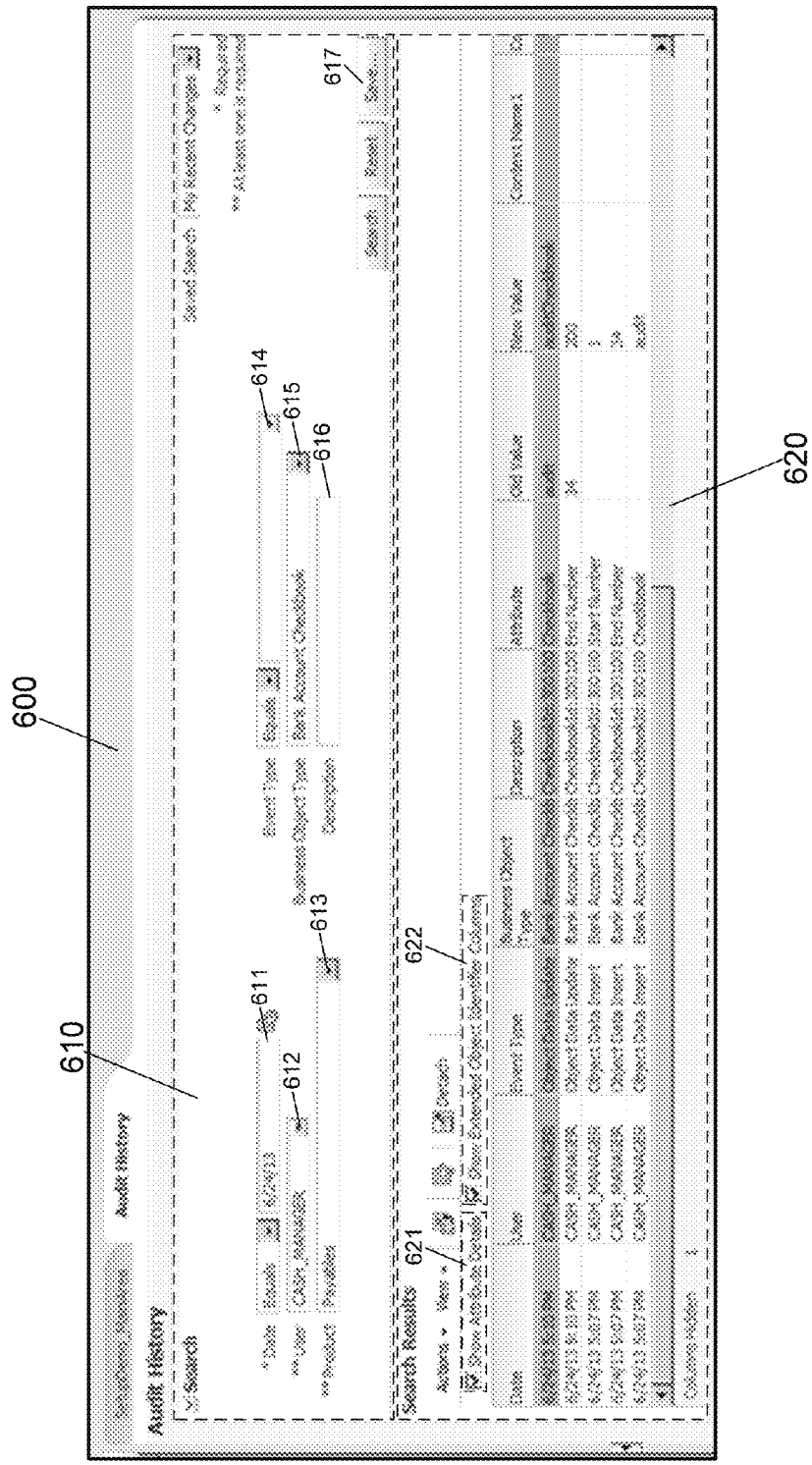
FIG. 6 illustrates an example audit report user interface, according to an embodiment of the invention.

FIG. 6 illustrates an example audit report user interface 600, according to an embodiment of the invention. According to the embodiment, the audit reporting system retrieves audit data from one or more shadow database tables, and displays the retrieved audit data within audit report user interface 600. In certain embodiments, the audit reporting system also retrieves audit data from an event database table, combines the audit data retrieved from the event database table with the audit data retrieved from the one or more shadow database tables, and displays the combined audit data within audit report user interface 600. According to the embodiment, the audit reporting system abstracts out the differences in the different formats of the audit data stored within the one or more shadow database tables and the audit data stored within the event database table, and displays the combined audit data within audit report user interface 600 using a single format.

According to an embodiment, a user can perform a search of the audit data using search window 610 of audit report user interface 600. More specifically, a user can perform a search of the audit data: (1) by entering a date or date range within date field 611; (2) by entering a user identifier within user field 612; (3) by entering a product identifier within product field 613; (4) by entering an event type within event type field 614; (5) by entering a business object type within business object type field 615; and/or (6) by entering a description within description field 616. Based one or more entered values within search window 610, the audit reporting system can retrieve and display audit data that includes the one or more entered values within search results window 620. If show attribute details checkbox 621 is enabled, search results window 620 can display attributes that have been modified, including old and new values for the attributes. Further, if show extended object identifier columns checkbox 622 is enabled, search results window 620 can display context columns that can help identify the business object that the attributes are associated with.

Figure 7:
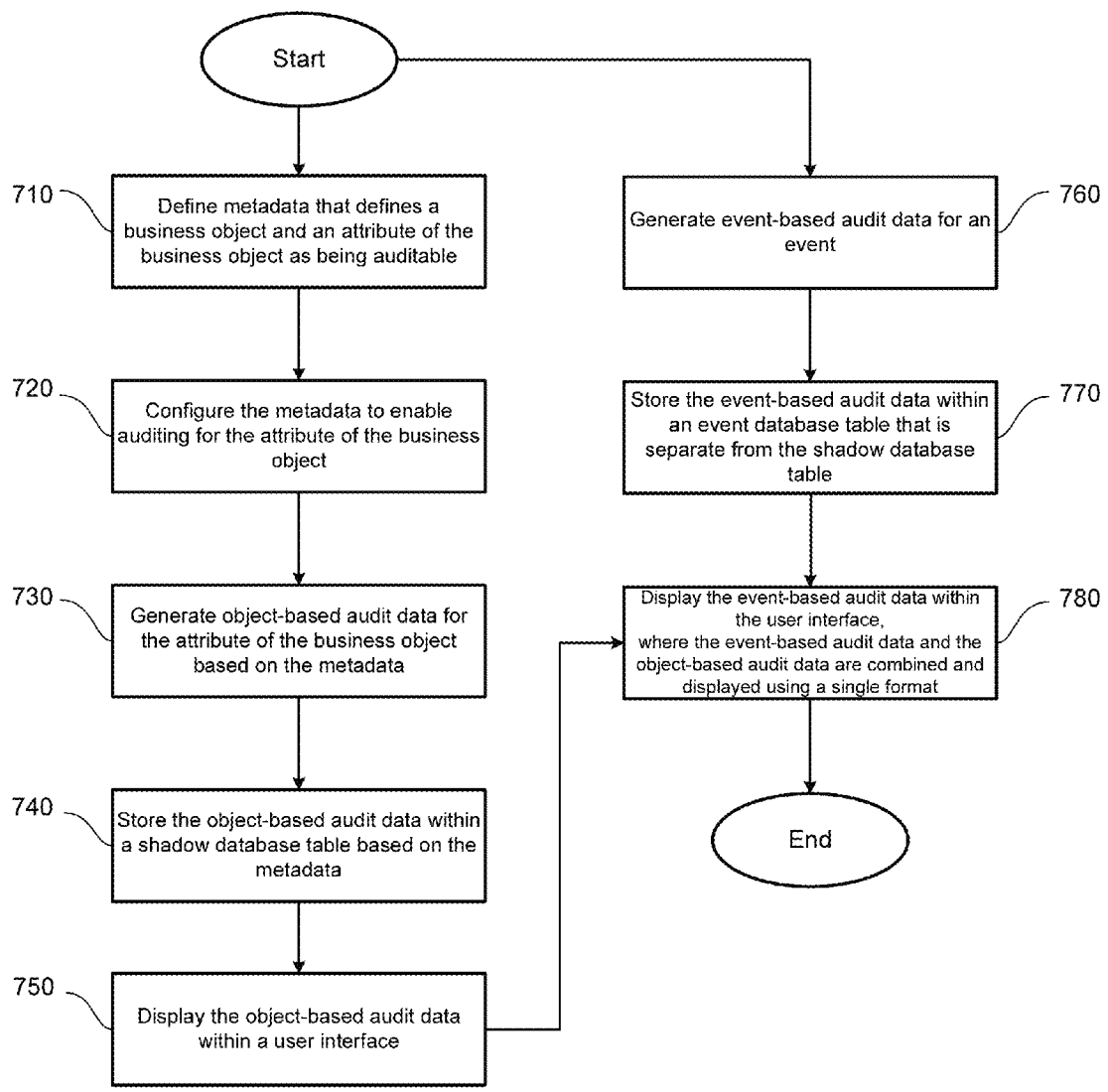
FIG. 7 illustrates a flow diagram of the functionality of a metadata-driven audit data reporting module, according to an embodiment of the invention.
Figure 10:
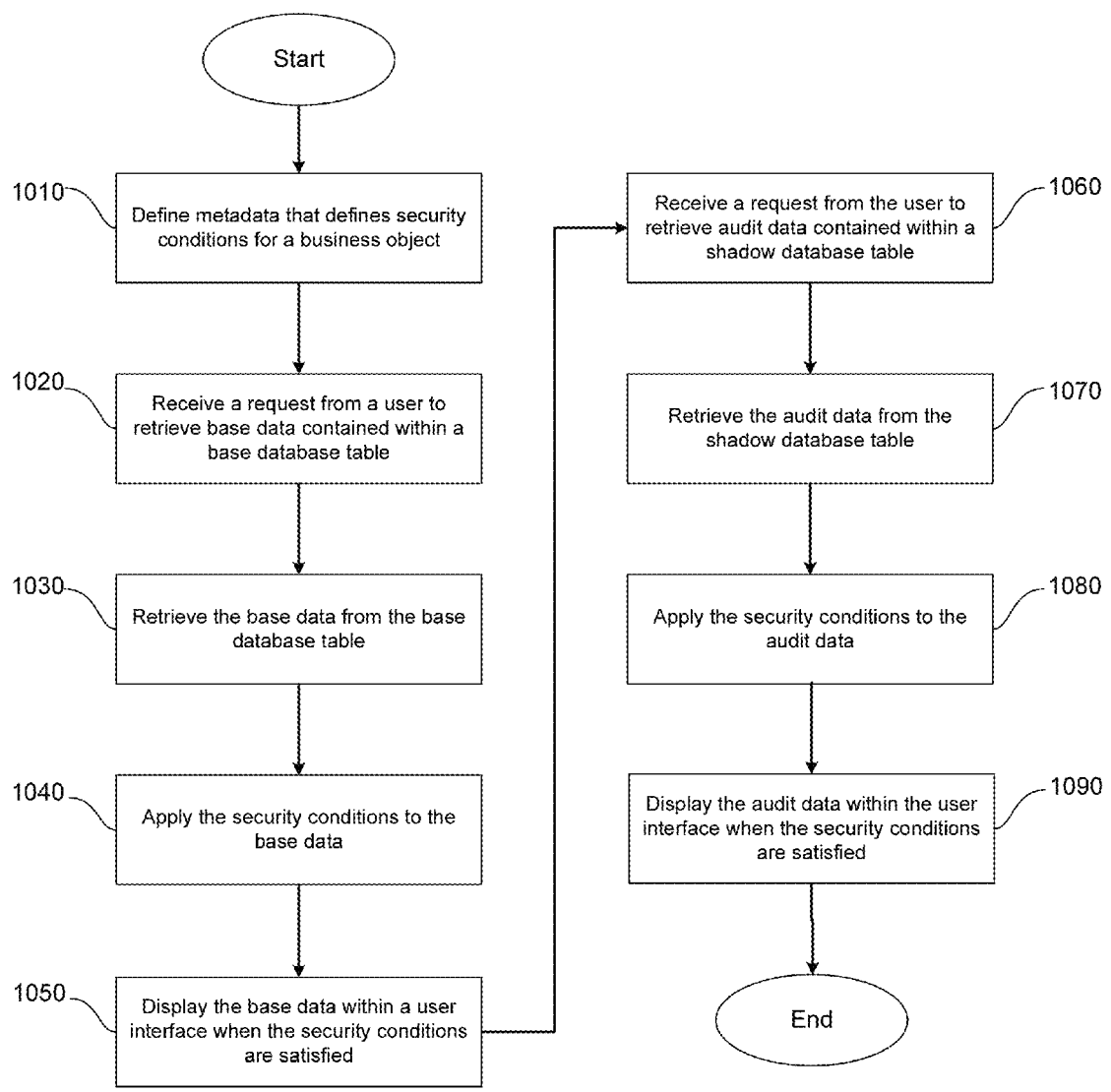
FIG. 10 illustrates a flow diagram of the functionality of a metadata-driven audit data reporting module, according to another embodiment of the invention.

FIG. 7 illustrates a flow diagram of the functionality of a metadata-driven audit data reporting module (such as metadata-driven audit data reporting module 16 of FIG. 1), according to an embodiment of the invention. In one embodiment, the functionality of the flow diagram of FIG. 7, as well as the functionality of the flow diagram of FIG. 10, are each implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some, or all, of each functionality may be omitted.

The flow begins, and proceeds to 710. Alternatively, the flow proceeds to 760 rather than 710. At 710, metadata is defined, where the metadata defines a business object of an application module and an attribute of the business object as being auditable. In certain embodiments, the metadata includes a business object identifier that identifies the business object of the application module, an attribute identifier that identifies the attribute of the business object, an auditing enabled flag that identifies whether auditing is enabled for the attribute, a shadow database table name that identifies the shadow database table, and a shadow database column name that identifies a column of the shadow database table. Further, in certain embodiments, the business object includes data contained within one or more base tables.

In some embodiments, a value of a property of the business object is set to a value that indicates the business object is auditable, and a value of a property of the attribute is set to a value that indicates the attribute is auditable. Further, in these embodiments, a business object identifier that identifies the business object and an attribute identifier that identifies the attribute of the business object are populated within the metadata based on the value of the property of the business object and the value of the property of the attribute. The flow proceeds to 720.

At 720, the metadata is configured to enable auditing for the attribute of the business object. In certain embodiments, the auditing enabled flag of the metadata is set to a value that indicates that auditing is enabled for the attribute. The flow proceeds to 730.

At 730, object-based audit data is generated for the attribute of the business object based on the metadata. The object-based audit data includes a history of one or more modifications to the attribute of the business object. In certain embodiments, the one or more modifications include one or more modifications to data contained with a base database table of the one or more base database tables of the business object. Further, in certain embodiments, the object-based audit data is only generated when the auditing enabled flag of the metadata is set to a value that indicates that auditing is enabled. The flow then proceeds to 740.

At 740, the object-based audit data is stored within a shadow database table based on the metadata. In certain embodiments, the shadow database table is separate from the one or more base database tables. Further, in certain embodiments, the object-based audit data is stored within the shadow database table that is identified by the shadow database table name of the metadata and stored within the column of the shadow database table identified by the shadow database table column name of the metadata. The flow then proceeds to 750.

At 750, the object-based audit data is displayed within a user interface. In certain embodiments, a search criteria is received, and the object-based audit data that satisfies the search criteria is displayed within the user interface. Further, in some of these embodiments, the search criteria includes at least one of: a date or a date range, and a user identifier or a product identifier. The flow then proceeds to 780.

At 760, event-based audit data is generated for an event of a separate application. The flow proceeds to 770.

At 770, the event-based audit data is stored within an event database table that is separate from the shadow database table, where a format of the event database table is different from a format of the shadow database table. The flow proceeds to 780.

At 780, the event-based audit data is displayed within the user interface, where the event-based audit data and the object-based audit data are combined and displayed using a single format. The flow then ends.

Figure 8:
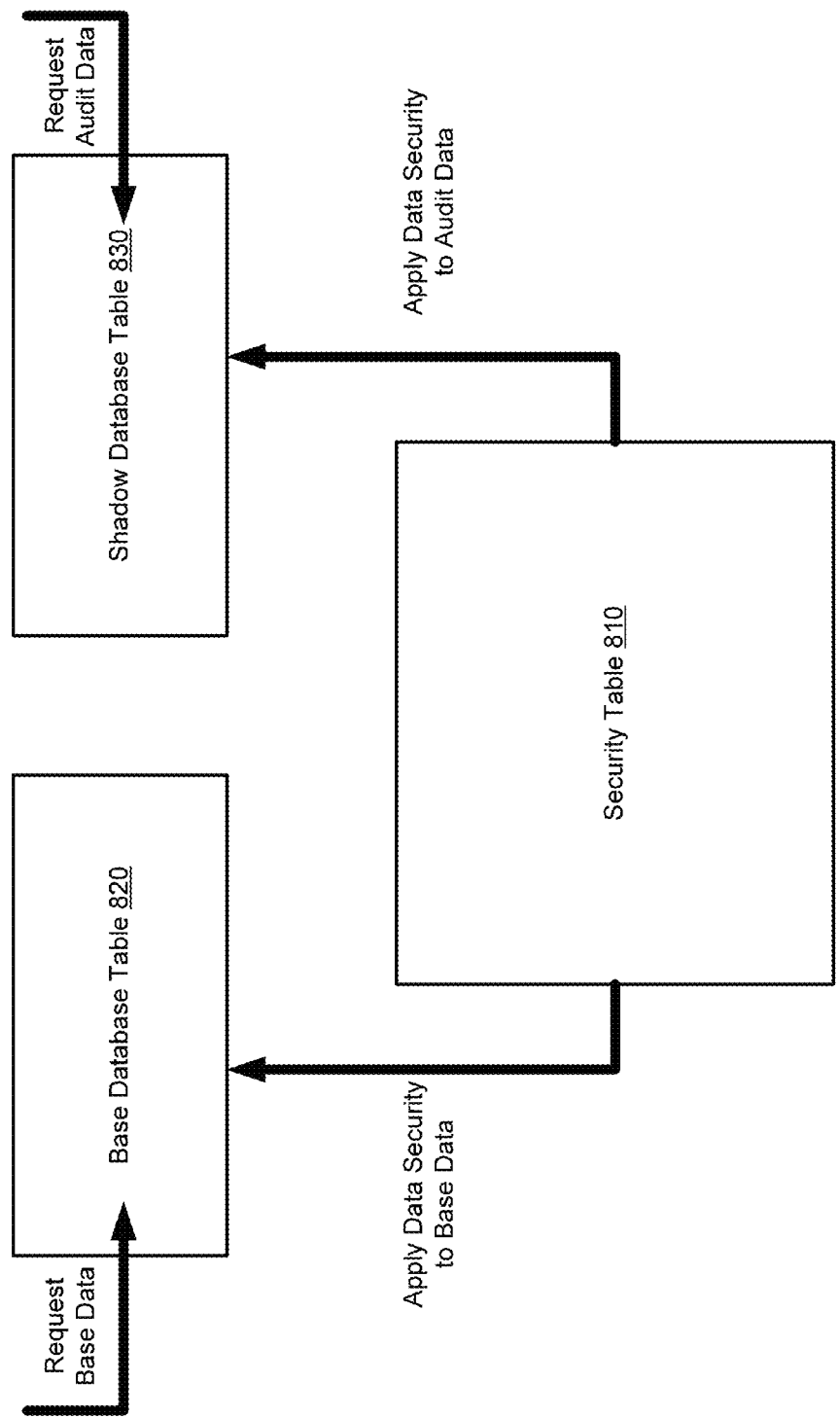
FIG. 8 illustrates an example security structure utilized to apply data security to audit data, according to an embodiment of the invention.

FIG. 8 illustrates an example security structure utilized to apply data security to audit data, according to an embodiment of the invention. As previously described, data security enforces security authorizations of specific data. According to the embodiment, the security structure illustrated in FIG. 8 includes security table 810. Security table 810 is a table that includes one or more "security conditions" (also identified as "security predicates"), that can enforce security authorizations of specific data. More specifically, a "security condition" is a natural-language statement that defines a granted privilege and an associated role (or an associated plurality of roles), where the granted privilege secures a business object. If a user is associated with the defined role, then the user can perform the granted privilege (i.e., entitlement or action) defined by the security condition. In other words, a security condition articulates a security requirement, "Who Can Do What On Which Set of Data," where "Which Set of Data" can be a business object, a business object instance, or a business object instance set, and "What" can be an entitlement to perform an action, such as an entitlement to access the business object, business object instance, or business object instance set. As an example, account payable managers can view data that corresponds to AP disbursements for their business units based on the following security condition:

| Who | Can Do | What | On Which Set Of Data |
|---|---|---|---|
| Accounts payable managers | View | AP disbursements | For their business unit |

According to the embodiment, the audit reporting system can define one or more roles that have an entitlement to access a business object, including all data associated with the business object. More specifically, for an instance of a business object, the audit reporting system can define one or more roles and one or more entitlements (such as entitlements to view the business object), and can associate the one or more roles with the one or more entitlements. Once a business object is enabled for auditing, the audit reporting system can generate metadata that defines one or more security conditions for the business object, and can apply the one or more security conditions to audit data that is associated with the business object, as is described below in greater detail.

The security structure also includes base database table 820 that stores base data (i.e., data that is associated with a business object, and stored within a base database table). In one embodiment, base database table 820 is identical to base database table 510 of FIG. 5. When a request to retrieve base data from base database table 820 is received, an audit reporting system can retrieve one or more security conditions from security table 810, can retrieve the base data stored within base database table 820, and can apply the retrieved one or more security conditions to the retrieved base data. If the one or more security conditions are satisfied, the audit reporting system can retrieve the base data and display the base data within a user interface, such as within a report that is displayed within the user interface. If the one or more security conditions are not satisfied, then the audit reporting system does not display the base data within the user interface. For example, if a user who sends the request to retrieve base data is associated with one or more roles defined by the one or more security conditions, the one or more security conditions are satisfied, and the base data can be displayed to the user within the user interface. However, if the user is not associated with one or more roles defined by the one or more security conditions, the one or more security conditions are not satisfied, and the base data is not displayed to the user within the user interface.

Thus, the security conditions stored within security table 810 can enforce access entitlements regarding base data associated with business objects. For example, user A (but not user B) can access business objects 1, 4, and 5 based on a first security condition. In contrast, user B (but not user A) can access business objects 2 and 3 based on a second security condition. Further, both users A and B can access business object 6 based on a third security condition.

The security structure also includes shadow database table 830 that stores audit data. In one embodiment, shadow database table 830 is identical to shadow database table 520 of FIG. 5. When a request to retrieve audit data from shadow database table 830 is received, the audit reporting system can retrieve one or more security conditions from security table 810, can retrieve the audit data stored within shadow database table 830, and can apply the retrieved one or more security conditions to the retrieved audit data. If the one or more security conditions are satisfied, the audit reporting system can retrieve the audit data and display the audit data within a user interface, such as within a report that is displayed within the user interface. If the one or more security conditions are not satisfied, then the audit reporting system does not display the audit data within the user interface. For example, if a user who sends the request to retrieve audit data is associated with one or more roles defined by the one or more security conditions, the one or more security conditions are satisfied, and the audit data can be displayed to the user within the user interface. However, if the user is not associated with one or more roles defined by the one or more security conditions, the one or more security conditions are not satisfied, and the audit data is not displayed to the user within the user interface.

Thus, the security conditions that are applied to the audit data can be identical to the security conditions that are applied to the base data. In one embodiment, metadata can be defined, where the metadata defines one or more security conditions for a business object. The metadata can be stored within security table 810 and within audit database table 830, as is further described in greater detail in conjunction with FIG. 9. According to the embodiment, the one or more security conditions can be selected from security table 810 and applied to the audit data stored within audit database table 830 based on the metadata. Further, in one embodiment, the security conditions can be applied to the audit data even when the original base data, that the audit data is based upon, is deleted from base database table 820.

FIG. 9 illustrates example security metadata stored within a shadow database table 910 and a security table 920, according to an embodiment of the invention. According to the embodiment, when audit data associated with a business object is generated and stored within shadow database table 910, a business object identifier 911, such as a primary key of the business object, is also stored within shadow database table 910. Business object identifier 911 is an example of security metadata and is associated with the audit data (e.g., an audit data record). Further, when a security condition is generated and stored within security table 920, a business object identifier 921, such as a primary key of a business object, is also stored within security table 920. Business object identifier 921 is also an example of security metadata, and is associated with the security condition. According to the embodiment, a security condition stored within security table 920 can be selected from security table 920 by matching business object identifier 921 that is associated with the security condition, with business object identifier 911 that is associated with the audit data. The security condition can subsequently be applied to the audit data stored within shadow database table 910 that is associated with business object identifier 911 based on the matching of business object identifier 921 with business object identifier 911. Thus, in the illustrated embodiment, the security condition "Security Condition 1" can be applied to the audit data associated with the business object identifier "101," the security condition "Security Condition 2" can be applied to the audit data associated with the business object identifier "102," and the security condition "Security Condition 3" can be applied to the audit data associated with the business object identifier "103."

FIG. 10 illustrates a flow diagram of the functionality of a metadata-driven audit data reporting module, according to another embodiment of the invention. The flow begins and proceeds to 1010. At 1010, metadata is defined that defines one or more security conditions for a business object. In certain embodiments, the metadata can include a first business object identifier that identifies the business object. The first business object can be associated with one or more security conditions. The metadata can further include a second business object identifier that also identifies the business object. The second business object identifier can be associated with audit data. Further, in certain embodiments, a security condition of the one or more security conditions can include a role and a privilege. In some of these embodiments, the role can include a grouping of one or more privileges, and the privilege can include an entitlement to access the business object. The flow then proceeds to 1020.

At 1020, a request is received from a user to retrieve base data contained within a base database table. In certain embodiments, the business object can include base data contained within the base database table. The flow then proceeds to 1030.

At 1030, the base data is retrieved from the base database table. The flow then proceeds to 1040.

At 1040, the one or more security conditions are applied to the base data. The flow then proceeds to 1050.

At 1050, the base data is displayed within a user interface when the one or more security conditions are satisfied. In certain embodiments, a security condition of the one or more security conditions can be satisfied when the user is associated with the role that is defined by the security condition. The flow then proceeds to 1060.

At 1060, a request is received from a user to retrieve audit data contained within a shadow database table. In certain embodiments, the audit data can include a history of one or more modifications to an attribute of the business object. Further, in some of those embodiments, the one or more modifications to the attribute of the business object can include one or more modifications to the base data contained within the base database table. The flow then proceeds to 1070.

At 1070, the audit data is retrieved from the shadow database table. The flow then proceeds to 1080.

At 1080, the one or more security conditions are applied to the audit data based on the metadata. In certain embodiments, the one or more security conditions can be selected based on the first business object identifier that is associated with the one or more security conditions, and the second business object identifier that is associated with the audit data. The flow then proceeds to 1090.

At 1090, the audit data is displayed within the user interface when the one or more security conditions are satisfied. In certain embodiments, the one or more security conditions that are applied to the audit data can be identical to the one or more security conditions that are applied to the base data. Further, in certain embodiments, the one or more security conditions can be applied to the audit data even when the base data contained within the base database table is deleted. The flow then ends.

Thus, an audit reporting system is provided that can apply security conditions to audit data, where the security conditions can be identical to the security conditions that are applied to the base data that the audit data is based upon. Thus, a security model for the audit data is aligned with a security model for the base data that the audit data is based upon, and the security conditions are applied to the audit data can be applied in the same manner that they are applied to the base data. Thus, the same users who can view a report associated with a business object, such as an expense report, that includes base data can also view the audit data for the report. This means that a user who is not explicitly granted access to the base data associated with the business object that is contained within the report cannot view the audit data for the report. This provides a consistent security model for both the base data and the audit data.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to report audit data, the reporting comprising:

configuring, using a graphical user interface, metadata that defines one or more security conditions for a business object that includes data contained within a first database table;

receiving, using the graphical user interface, a request from a user to retrieve audit data contained within a second database table, audit data including a history of one or more modifications to the business object data contained within the first database table;

retrieving the audit data from the second database table even when the business object data contained within the first database table is deleted; and displaying, using the graphical user interface, the audit data to the user when the one or more security conditions for the business object are satisfied by the user.

2. The computer-readable medium of claim 1, the reporting further comprising:

receiving, using the graphical user interface, a request from the user to retrieve the data contained within the first database table;

retrieving the data from the first database table; and displaying, using the graphical user interface, the data to the user when the one or more security conditions for the business object are satisfied by the user.

3. The computer-readable medium of claim 1, wherein the metadata comprises a first business object identifier that identifies the business object and that is associated with the one or more security conditions; and wherein the metadata comprises a second business object identifier that identifies the business object and that is associated with the audit data.

4. The computer-readable medium of claim 1, wherein a security condition of the one or more security conditions comprises a role and a privilege;

wherein the security condition of the one or more security conditions is satisfied when the user is associated with the role.

5. The computer-readable medium of claim 4,
wherein the role comprises a grouping of one or more privileges, and
wherein the privilege comprises an entitlement to access the business object.

6. The computer-readable medium of claim 1, wherein the modifications to the business object data include insert operations, update operations, or delete operations.

7. A computer-implemented method for reporting audit data, the computer-implemented method comprising:
configuring, using a graphical user interface, metadata that defines one or more security conditions for a business object that includes data contained within a first database table;
receiving, using the graphical user interface, a request from a user to retrieve audit data contained within a second database table, audit data including a history of one or more modifications to the business object data contained within the first database table;
retrieving the audit data from the second database table even when the business object data contained within the first database table is deleted; and
displaying, using the graphical user interface, the audit data to the user when the one or more security conditions are satisfied by the user.

8. The computer-implemented method of claim 7, further comprising:
receiving, using the graphical user interface, a request from the user to retrieve the data contained within the first database table;
retrieving the data from the first database table; and
displaying, using the graphical user interface, the data to the user when the one or more security conditions are satisfied by the user.

9. The computer-implemented method of claim 7,
wherein the metadata comprises a first business object identifier that identifies the business object and that is associated with the one or more security conditions; and
wherein the metadata comprises a second business object identifier that identifies the business object and that is associated with the audit data.

10. The computer-implemented method of claim 7,
wherein a security condition of the one or more security conditions comprises a role and a privilege;
wherein the security condition of the one or more security conditions is satisfied when the user is associated with the role.

11. The computer-implemented method of claim 10,
wherein the role comprises a grouping of one or more privileges, and
wherein the privilege comprises an entitlement to access the business object.

12. The computer-implemented method of claim 7, wherein the modifications to the business object data include insert operations, update operations, or delete operations.

13. A system, comprising:
a metadata definition module configured to configure metadata that defines one or more security conditions for a business object that includes data contained within a first database table;
an audit data request module configured to receive a request from a user to retrieve audit data contained within a second database table, the audit data including a history of one or more modifications to the business object data contained within the first database table;
an audit data retrieval module configured to retrieve the audit data from the second database table even when the business object data contained within the first database table is deleted; and
an audit data display module configured to display the audit data, using a graphical user interface, to the user when the one or more security conditions for the business object are satisfied by the user.

14. The system of claim 13, further comprising:
a data request module configured to receive a request from the user to retrieve the data contained within the first database table;
a data retrieval module configured to retrieving the data from the first database table;
a data display module configured to display, using the graphical user interface, the data to the user when the one or more security conditions are satisfied by the user.

15. The system of claim 13,
wherein the metadata comprises a first business object identifier that identifies the business object and that is associated with the one or more security conditions; and
wherein the metadata comprises a second business object identifier that identifies the business object and that is associated with the audit data.

16. The system of claim 13, wherein the modifications to the business object data include insert operations, update operations, or delete operations.

* * * * *